United States Patent [19]
Claude et al.

[11] Patent Number: 5,678,808
[45] Date of Patent: Oct. 21, 1997

[54] SUSPENSION STRUT ASSEMBLY

[75] Inventors: George Thomas Claude, Bellbrook; James Mitchell Pees, Centerville, both of Ohio

[73] Assignee: General Motors Corporation, Detroit, Mich.

[21] Appl. No.: 529,792

[22] Filed: Sep. 18, 1995

[51] Int. Cl.⁶ ................................................. B60G 13/00
[52] U.S. Cl. ................ 267/64.15; 188/314; 188/321.11; 188/269; 188/318; 267/220; 267/221; 267/34; 267/35; 267/64.26
[58] Field of Search ............................... 188/298, 314, 188/315, 321.11, 318, 269, 282, 317, 281, 322.22; 267/64.15–64.28, 33, 34, 35, 220, 259, 218, 219, 221, 226, 140.11, 141, 64.16, 64.17, 116; 280/709, 668, 716, 693, 698, 702, 708; 244/4 FP; 138/31

[56] References Cited

U.S. PATENT DOCUMENTS

| | | | |
|---|---|---|---|
| 2,089,656 | 8/1937 | Magrum | 188/282 |
| 2,512,269 | 6/1950 | Ezbelent | 188/275 |
| 2,636,726 | 4/1953 | Mercier | 188/317 |
| 2,661,207 | 12/1953 | Allinquant | 267/64.23 |
| 2,819,064 | 1/1958 | Peras | 267/64 |
| 2,924,305 | 2/1960 | Roder | 188/315 |
| 2,980,418 | 4/1961 | Doetsch | 267/64.15 |
| 3,105,574 | 10/1963 | Hoffmann et al. | 188/269 |
| 3,148,871 | 9/1964 | Wilkins et al. | 280/708 |
| 3,178,167 | 4/1965 | Menar | 188/269 |
| 3,625,321 | 12/1971 | Lutz | 188/315 |
| 3,770,258 | 11/1973 | Takahashi et al. | 188/298 |
| 3,955,807 | 5/1976 | Takahashi et al. | 280/708 |
| 4,106,596 | 8/1978 | Hausmann | 188/314 |
| 4,189,034 | 2/1980 | Kato | 188/318 |
| 4,234,172 | 11/1980 | Takahashi | 267/220 |
| 4,452,436 | 6/1984 | Gute | 267/64.15 |
| 5,058,868 | 10/1991 | Sirven | 267/35 |
| 5,078,370 | 1/1992 | McClellan | 280/668 |
| 5,467,971 | 11/1995 | Hurtubise et al. | 280/668 |

FOREIGN PATENT DOCUMENTS

| | | | |
|---|---|---|---|
| 62894 | 5/1952 | France | 188/298 |
| A-1060812 | 4/1954 | France . | |
| A-2507725 | 12/1982 | France . | |
| B-1183384 | 12/1964 | Germany . | |
| 2847816 | 5/1979 | Germany | 267/64.23 |
| 3737173 | 5/1989 | Germany | 188/322.22 |
| A-3925074 | 2/1990 | Germany . | |
| A-4138238 | 5/1993 | Germany . | |
| 57-204343 | 12/1982 | Japan | 188/281 |
| 63-6239 | 1/1988 | Japan | 188/281 |
| 231036 | 2/1990 | Japan | 267/116 |
| 0992861 | 1/1983 | U.S.S.R. | 267/64.15 |
| 1071843 | 3/1965 | United Kingdom | 280/709 |
| A-1172555 | 12/1969 | United Kingdom . | |
| A-2076933 | 12/1981 | United Kingdom . | |
| A-1029390 | 5/1996 | United Kingdom . | |

OTHER PUBLICATIONS

Patent Abstracts of Japan, vol. 013, No. 593 (M–914), 27 Dec. 89 & JP,A,01 250634 5 Oct. 1989.

Primary Examiner—Douglas C. Butler
Attorney, Agent, or Firm—Jeffrey A. Sedlar

[57] ABSTRACT

A gas charged monotube strut carries the accumulator outside the damper's cylinder tube and within the strut mount. A substantially direct flow path is provided between the damper and the accumulator through the damper's piston rod. Air to oil separation is maintained by a gas cup and a low profile of packaging is provided.

5 Claims, 3 Drawing Sheets

SUSPENSION STRUT ASSEMBLY

BACKGROUND OF THE INVENTION

The present invention relates to suspension damper assemblies and more particularly, to a monotube gas charged strut assembly.

A strut is a type of damper usable in vehicular suspensions as both a damping device and as part of the suspension's load bearing structure. Monotube gas charged dampers are conventionally known wherein a piston with a connected piston rod is slidably contained in a fluid filled tube with a separate piston called a gas cup slidably carried in the tube on the opposite side of the piston from the rod. The gas cup separates a compressible gas charge from the fluid. It has been found that monotube gas charged dampers exhibit desirable performance characteristics when used in some suspension assemblies.

The use of gas charged monotube dampers has been limited to only certain suspension assemblies. For example, when a strut type damper is used in a front wheel drive vehicle, it is generally carried above the axle and below the hood or fender line. This limits the overall length of the strut. For viability, the travel length of a strut must be acceptably long as determined by the vehicle's suspension requirements. With known monotube gas charged dampers, the gas charge and gas cup introduce a significant amount of inactive length to the assembly, thereby reducing active travel length of the damper. This creates difficulties in packaging the strut within the suspension.

A further complicating factor in providing an acceptable travel length arises due to lateral load carrying requirements placed on strut type dampers. To sufficiently carry loads, a strut's structural rod is generally larger in diameter than that of a comparable shock type damper which is not required to carry side loads. Therefore, the amount of oil displaced when a strut rod enters the tube during compression is greater than that displaced in a comparable shock type damper. Displacement of more fluid in turn requires greater linear movement of the gas cup and necessarily increases the overall length of the strut assembly.

SUMMARY OF THE INVENTION

It has been found that when a damper's gas cup must travel great lengths during damper operation, velocity gradients are negatively impacted by gas cup inertia. Further, over the life of a damper, gas cup seal wear may become problematic when excessive travel distances must be covered.

It has also been found that when space limitations exist, fluid expansion due to heating becomes a factor in providing a damper with sufficient active travel. This is because a damper operates to convert kinetic energy in the form of motion into heat as a means of providing suspension damping. When heated, the damper's fluid expands which must be accommodated in the damper design, generally by additional length.

Therefore, according to an aspect of the present invention a monotube strut is provided which includes a piston slidably sealingly positioned within the tube and separating the tube into compression and rebound chambers. A rod is attached to the piston and extends through the rebound chamber and out of the tube. The rod includes a longitudinal bore which permits fluid carried within the tube to communicate from the compression chamber through the rod. An accumulator is positioned about the rod outside the tube to communicate substantially directly with the damper's interior and defines an annular cavity thereabout, slidably sealingly carrying a gas cup. The gas cup defines an expansion chamber and a compensation chamber within the annular cavity, the expansion chamber being in communication with the longitudinal bore of the rod and the compensation chamber being adapted to carry a gas charge. The gas cup maintains air to oil separation.

Placing the gas cup outside the tube enables a means of providing an acceptable gas cup to piston area ratio. The area ratio directly determines the dynamic stroking ratio between the piston and the gas cup. Therefore, providing an acceptably large area ratio results in an acceptably low gas cup travel distance without negatively impacting upon the struts inactive length.

According to an optional aspect of the present invention an angularly constructed gas cup is provided in the accumulator. An accumulator wall is angled to match the contour of the gas cup and thereby not unduly inhibit vertical travel. This provides a means of raising the position of the gas cup relative to the tube and in maximizing travel of the gas cup without negatively impacting upon the area ratio.

DETAILED DESCRIPTION OF THE PRESENTLY PREFERRED EMBODIMENTS

Figure 1:
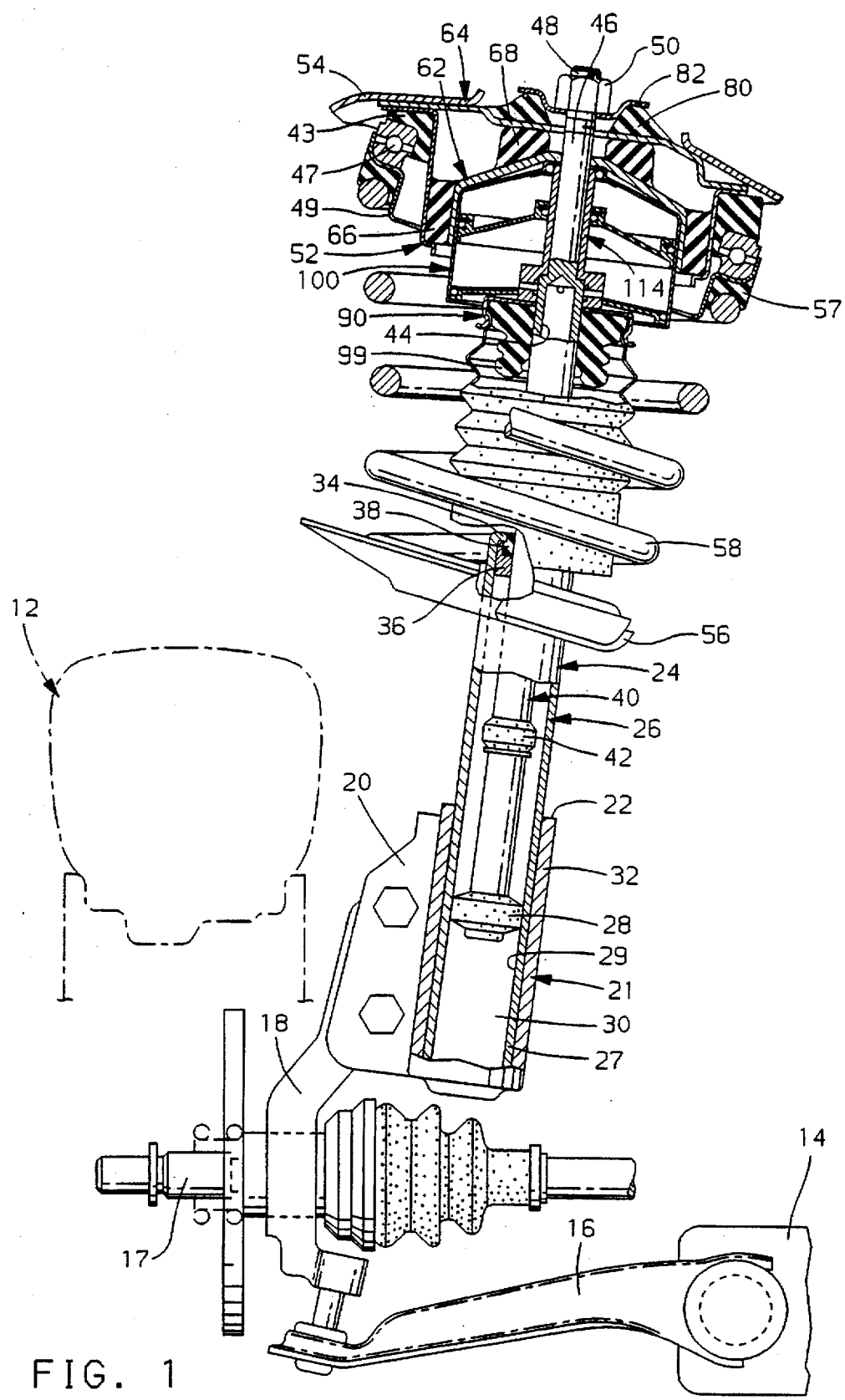
FIG. 1 is a fragmentary view of a suspension strut assembly of a vehicle.

Referring to the drawings, illustrated in FIG. 1 is the suspension area of a motor vehicle having a steerable front wheel assembly 12 connected to a vehicle frame 14 by a lower control arm 16. The wheel assembly 12 is mounted on a driven wheel spindle 17 which rotatably extends through steering knuckle 18. A bracket 20 having an integral tubular element 21 with an open top end 22 is attached to the steering knuckle 18.

Bracket 20 carries a suspension damper 24 within tubular element 21. Damper 24 has an elongated outer cylindrical tube 26 which is closed at its lower end 27. A piston assembly 28 is mounted for reciprocal movement within tube 26. The piston assembly 28 slidably and sealingly engages the inner wall 29 of tube 26. Piston assembly 28 hydraulically separates the tube 26 into two expansible and contractible working chambers designated as compression chamber 30 which is defined between the piston assembly 28 and the lower end 27 of tube 26 and rebound chamber 32 which is defined between the piston assembly 28 and the upper end 34 of tube 26.

A hollow tube designated as piston rod 40 is connected to piston assembly 28 and extends through the rebound chamber 32, the rod guide 36 and the seal 38 and exits the suspension damper 24. A resilient rebound stop 42 is carried on piston rod 40 and serves to limit the upward travel of piston assembly 28 within tube 26 by contacting the rod guide 36 to prevent excessive travel.

The suspension damper 24 rigidly carries a spring seat 56 that is substantially annular in configuration and is attached to the outside of tube 26. A coil spring 58 encircles the piston rod 40 and extends between the spring seat 56 and the mount assembly 52. A resilient insulator 57 is carried between the support 49 and the spring 58.

Figure 2:
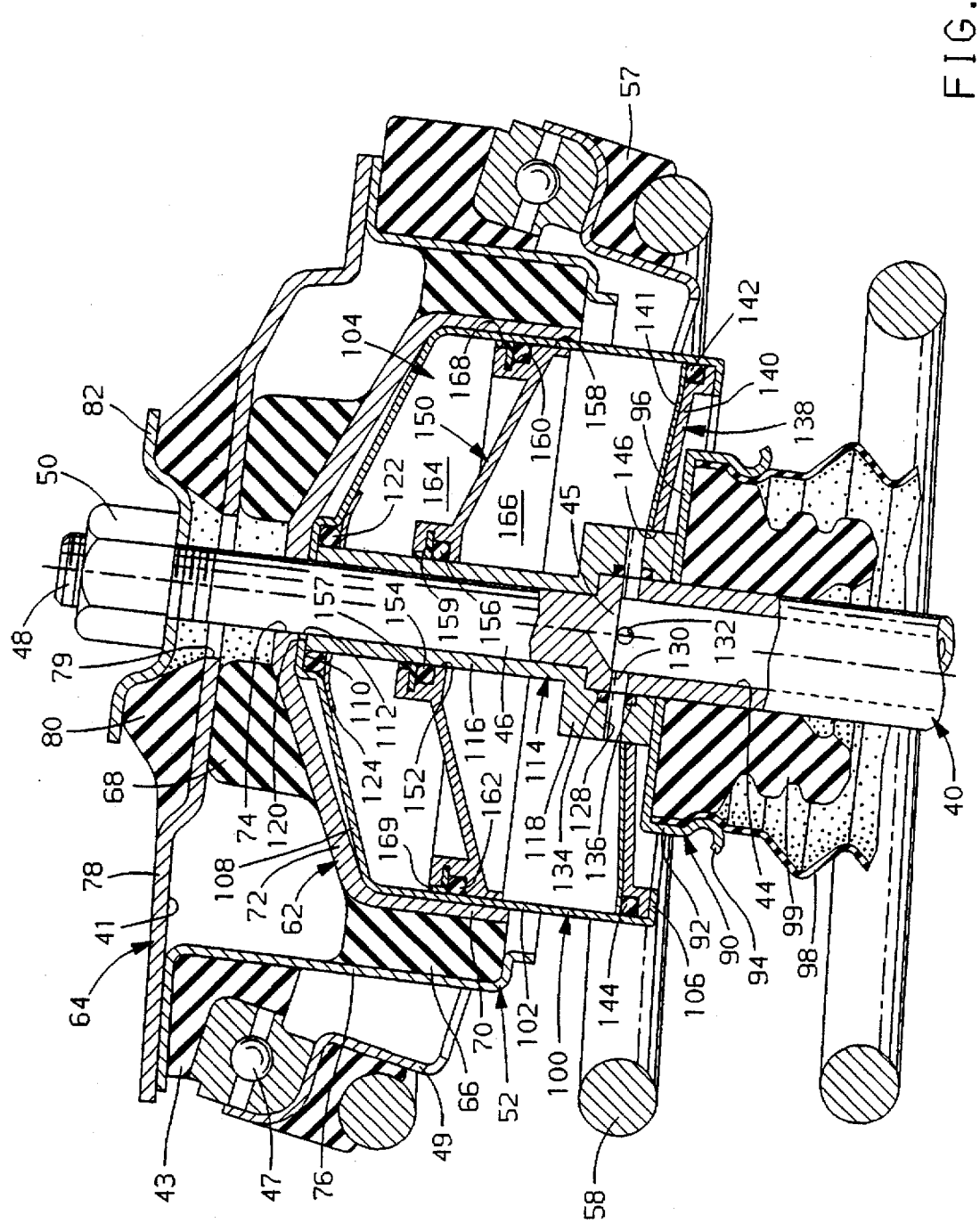
FIG. 2 is a fragmentary, cross-sectional view of the mount area of the strut assembly shown in FIG. 1.

Referring to FIG. 2, the area of mount assembly 52 is illustrated in greater detail. The piston rod 40 includes an internal bore 44 which terminates at upper bore end 45 from which point a reduced diameter segment 46 of solid construction of piston rod 40 continues upwardly and terminates in threaded segment 48. A nut 50 is threaded onto threaded segment 48 and through mount assembly 52 the piston rod 40 is attached to the strut tower 54 of the vehicle (as shown in FIG. 1).

The mount assembly 52 generally comprises inner and outer cups 62 and 64 which are resiliently bonded together by elastic elements 66 and 68. The inner cup 62 is formed of an acceptably rigid material such as metal and consists of one piece having a cylindrical wall 70 and an annular base wall 72. The base wall 72 has an opening 74 which is received over the rod segment 46.

The outer cup 64 is comprised of two elements which are fastened together and are designated as cylindrical wall 76 and annular wall 78. Annular wall 78 includes opening 79 and is positioned about the rod segment 46. An annular resilient bumper 80 is bonded to the upper surface of annular wall 78 and is compressed between outer cup 64 and washer 82 which is engaged by nut 50.

Outer cup 64 includes an elliptical shelf 41 to which a resilient element 43 is bonded. Resilient element 43 is supported by bearing assembly 47. Bearing assembly 47 permits steering of the wheel assembly 12, with the damper 24 and accumulator 100 turning therewith. Bearing assembly 47 is supported on coil spring 58 by resilient insulator 57 and support 49.

Spaced away from the mount assembly 52 by an annular bushing 114 is a retainer 90 which includes an annular wall 92 having an integral annular clip 94 and an annular base wall 96. The retainer 90 is positioned about the piston rod 40. The retainer 90 carries a boot or dust cover 98 which extends about piston rod 40 and continues down over tube 26. Also carried by retainer 90 is an annular resilient jounce bumper 99 which serves to cushion the maximum compression of the damper 24.

A unitary accumulator assembly 100 is carried about piston rod 40 and within the mount assembly 52. The accumulator assembly 100 has a wall 102 which defines a cavity 104 and includes an inwardly turning annular flange 106. The upper portion of the wall 102 defines a conical shaped upper dome 108 having an annular recess 110 defined about an opening 112 which receives rod segment 46.

The annular bushing 114 which includes a first cylindrical section 116 and a larger second cylindrical section 118 is received within the cavity 104 and is positioned about the rod 40. Cylindrical section 116 includes an end 120 which is received within recess 110. Through the inter-positioning of annular seal 122 and annular seal retainer 124 a gas-tight closure is provided about the opening 112.

The cylindrical section 118 includes a cross bore 128 which corresponds with lateral bore 130 of piston rod 40. A second lateral bore 132 in piston rod 40 communicates with a second cross bore (not illustrated) in cylindrical section 118 in a like manner. The lateral bores 130 and 132 intersect bore 44 and in combination with the cross bores, provide a means of communication between the cavity 104 and the bore 44 of piston rod 40. A pair of annular seals 134 and 136 provide a gas-tight closure between the cylindrical section 118 and the piston rod 40.

The cavity 104 of accumulator assembly 100 includes a bottom closure in the form of funnel-shaped wall 138 which spans between the cylindrical section 118 below the cross bore 128 and the cylindrical wall 102 above annular flange 106. Wall 138 is comprised of mating first and second sections 140 and 141 which form a seal groove 142 within which is carried an annular seal 144. The annular seal 144 sealingly mates with wall 102. The inner perimeter 146 of wall 138 is interconnected with the cylindrical section 118 by an appropriate means such as welding.

A piston-like element in the form of annular gas cup 150 is sealingly and slidably carried within accumulator assembly 100 and spans between the cylindrical section 116 of annular bushing 114 and the wall 102. The conical shaped upper dome 108 in the accumulator wall 102 in combination with a corresponding conical shaped gas cup 150, provides a means of increasing the area ratio. This is provided by maximizing the surface area of the gas cup 150 with a greater length being provided between the annular bushing 114 and the wall 102.

Suspension travel is maximized because the gas cup 150 must travel a distance relative to the distance traveled by the piston assembly 28. By providing a gas cup 150 with increased surface area due to the conical design, vertical travel requirements are minimized. Therefore, negative impacts on active travel length of the damper 24 are minimized.

The gas cup 150 includes an inner perimeter 152 which includes an annular groove 154 that carries an annular seal 156 sealingly mating with the cylindrical section 116. The inner perimeter 152 also includes an annular groove 157 that carries a bearing 159 preferably made of a low friction material such as TEFLON Trademark) (PTFE). The bearing 159 bears against the cylindrical section 116 of annular bushing 114.

The gas cup 150 also includes an outer perimeter 158 which includes an annular groove 160 that carries an annular seal 162. The annular seal 162 sealingly mates with the inner surface of wall 102. The outer perimeter 158 also includes an annular groove 168 that carries a bearing 169. The bearing 169 bears against wall 102 of accumulator assembly 100.

The gas cup 150 separates the cavity 104 into two chambers designated as expansion chamber 164 and compensation chamber 166. The expansion chamber 164 is optionally provided with a pre-pressurized gas charge or carries the ambient pressure existing within the environment within which the accumulator assembly 100 is assembled.

The unitized pre-assembled accumulator assembly 100 is readily receivable over the piston rod 40 with the cylindrical section 118 of annular bushing 114 engaging the retainer 90. The wall 102 is matingly received within inner cup 62 of mount assembly 52 such that the upper dome 108 in the area of annular recess 110 engages the annular base wall 72. A continuously open means of communication is provided between the bore 44 of piston rod 40 and the compensation chamber 164 of accumulator assembly 100. The gas cup 150 is reciprocally moveable to respond to varying pressure within the compensation chamber 164 resulting from the varying pressure within compression chamber 30 of suspension damper 24 by reciprocal movement of the piston assembly 28 within tube 26 in response to suspension cycling.

During a compression stroke of the suspension damper 24, there is a downward motion of the piston assembly 28 within the tube 26. In response, fluid carried within the tube 26 is forced from the compression chamber 30 through conventionally known responsive valving (not illustrated) in the piston assembly 28 and into the rebound chamber 32.

Whereas, during the downward movement of the piston assembly 28 an increasing amount of the piston rod 40 is entering the tube 26 through the rod guide 36, a corresponding amount of fluid must be displaced from within the cylindrical tube 26. Therefore, a means of compensation is provided by permitting flow through the bore 44 of piston rod 40 into the lateral bores 130 and 132 and successively into the cross bores of the annular bushing 114, to the compensation chamber 166 of accumulator assembly 100. In response to the increasing quantity of fluid entering compensation chamber 166, the gas cup 150 is caused to move upwardly compressing the gas within expansion chamber 164.

During a rebound stroke of damper 24, there is an upward motion of the piston assembly 28 within the tube 26 such that an increasing amount of the piston rod 40 is exiting the tube 26 through the rod guide 36. Fluid is transferred from the rebound chamber 32 to the compression chamber 30 through the valving of piston assembly 28 and to compensate for the movement of the rod 40 out of the tube 26, the compressible gas within expansion chamber 164 of accumulator assembly 100 causes the gas cup 150 to move downwardly, moving a corresponding amount of fluid from the compensation chamber 166 through the cross bores, the lateral bores 130 and 132 and through the bore 44 into the compression chamber 30.

By means of the foregoing structure a suspension strut of the monotube type is provided which benefits from enhanced performance characteristics by means the gas accumulator 100 without significantly increasing the inactive length of the suspension damper such that the assembly is readily mountable between a strut tower 54 and a steering knuckle 18 without interfering with a neighboring drive axle.

The unique means of compensating for the fluid displaced by the movement of the piston rod into and out of cylinder tube as described herein, increases the applicability of gas charged monotube strut-type dampers to suspension systems. This is the case even though the piston rod is generally of heavier construction than that of a shock absorber type damper system due to the need to carry loading imparted to the suspension system from the wheel assembly.

Figure 3:
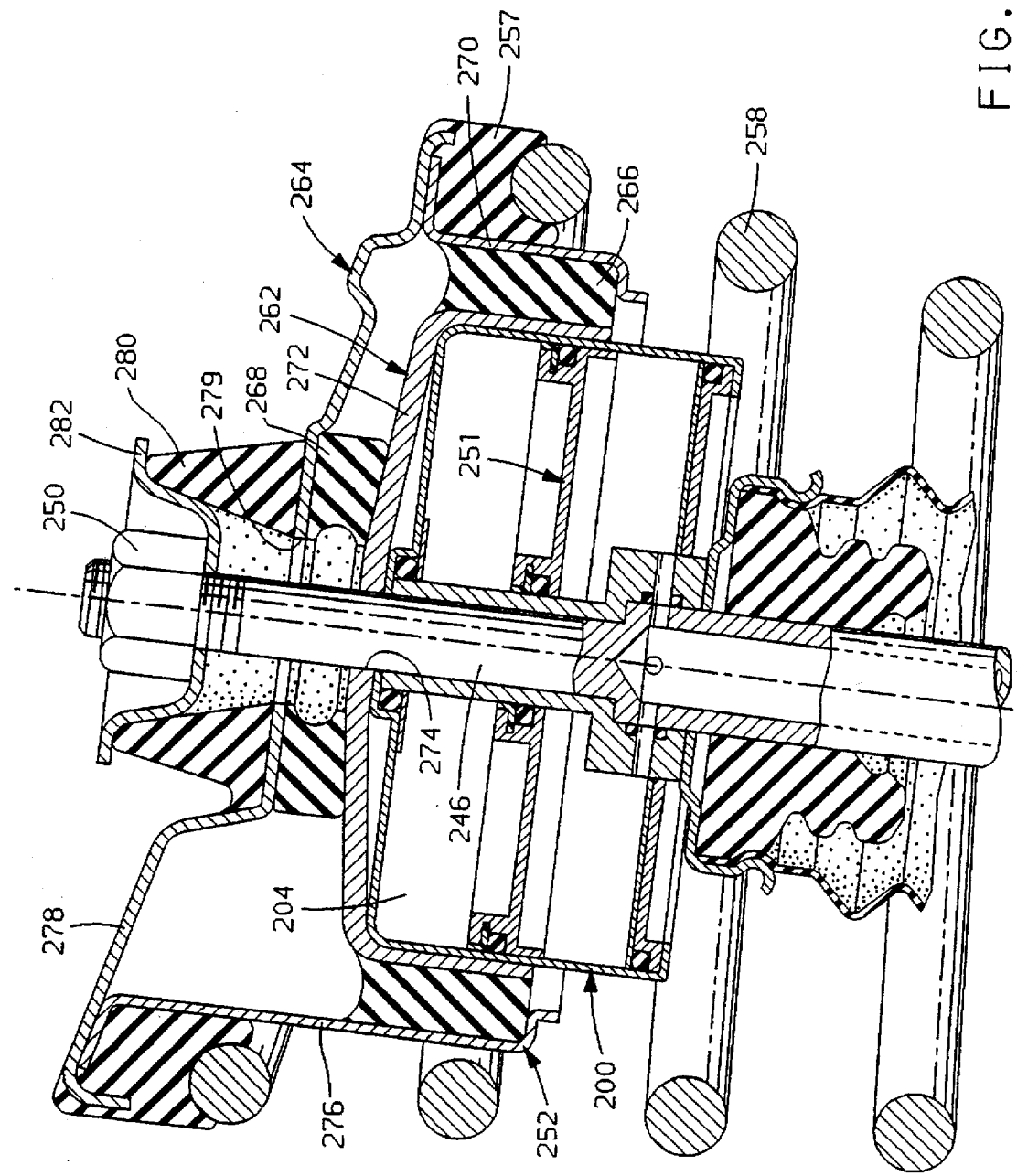
FIG. 3 is a fragmentary, cross-sectional view of the mount area of an alternative strut assembly according to the present invention.

Referring to FIG. 3, an alternative embodiment of the present invention is illustrated. The mount assembly 252 is adapted for use in a non-steerable assembly. Mount assembly 252 generally comprises inner and outer cups 262 and 264 which are resiliently bonded together by elastic elements 266 and 268. The inner cup 262 consists of one piece having a generally annular configuration with an annular base wall 272. The base wall 272 has an opening 274 which is received over the rod segment 246.

The outer cup 264 is comprised of two elements which are fastened together including an annular wall 278 and an elliptical wall with long side 276 and short side 270. Annular wall 278 includes opening 279 and is positioned about the rod segment 246. An annular resilient bumper 280 is bonded to the upper surface of annular wall 278 and is compressed between outer cup 264 and washer 282 which is engaged by nut 250.

Outer cup 264 is supported on coil spring 258 directly by spring seat 257 and serves as a support therefor. Because a bearing assembly is not required, the diameter of inner cup 262 can be maximized. Therefore, the unitary accumulator assembly 200 has a cavity 204 sufficiently large in diameter such that gas cup 251 is provided in a generally flat annular shaped assembly. The surface area of the gas cup 251, although sufficient in the present annular configuration, may be increased as necessary by utilizing a funnel shaped gas cup as described with reference to FIG. 2. The operation of the accumulator 200 is substantially the same as described with reference to FIG. 2.

What is claimed is:

1. A suspension strut assembly comprising:

a tube;

a rod guide closing one end of the tube;

a piston assembly slidably sealingly positioned within the tube and separating the tube into compression and rebound chambers;

a piston rod connected to the piston assembly and extending through the rebound chamber and the rod guide and exiting the tube;

an accumulator having, a wall defining a chamber around the rod outside the tube and carrying a gas cup slidably sealingly engaging the wall and separating the chamber into expansion and compensation chambers, the piston rod including at least one bore communicating between the compression chamber and the expansion chamber; and a mount having an inner cup positioned about the rod wherein the wall includes an upper dome with an inner annular recess engaging the inner cup and further comprising a bushing having a longitudinal opening receiving the rod and having a first end engaging the recess and having a second end and further comprising a jounce bumper received about the rod and engaging the second end of the bushing.

2. A suspension strut assembly according to claim 1 wherein the gas cup is annular and is carried about the bushing.

3. A suspension strut assembly comprising:

a tube having first and second ends;

a rod guide closing the first end of the tube, the second end being closed;

a piston assembly slidably sealingly positioned within the tube defining a compression chamber between the piston and the second end of the tube and defining a rebound chamber between the piston and the rod guide;

a piston rod connected to the piston assembly and extending through the rebound chamber and through the rod guide exiting the tube and having a terminal end outside the tube, the rod having a longitudinal bore communicating with the compression chamber and having at least one lateral bore intersecting the longitudinal bore;

a strut mount secured on the terminal end of the rod having an outer cup including a laterally extending element and an engaging annular longitudinally extending element, the outer cup carrying a resilient annular first spring seat and at least one annular resilient element the strut mount also having an inner cup secured to the at least one annular resilient element the inner cup disposed about the rod;

an accumulator having a wall defining a cavity with an upper dome having a recess engaging the inner annular cup the cavity closed by an annular plate that is disposed about the rod and which sealingly engages the wall;

a bushing having a longitudinal bore receiving the rod and having a first end engaging the wall within the recess and a second end with an opening near the second end communicating with the lateral bore of the piston rod;

a seal disposed in the recess about the first end of the bushing;

a gas cup sealingly engaging the wall and the bushing and separating the cavity of the accumulator into compensation and expansion chambers;

a retainer disposed about the rod and engaging the second end of the bushing;

a jounce bumper carried by the retainer about the rod;

a dust tube carried by the retainer about the rod;

a second spring seat carried by the tube; and a coiled spring compressed between the first and second spring seats.

4. A damper comprising:

a tube defining at least one chamber;

a piston assembly slidably positioned within the tube;

a piston rod connected to the piston assembly, exiting the tube, and having a terminal end;

a mount secured to the terminal end of the piston rod;

an accumulator carried about the piston rod including an annular piston separating the accumulator into an expansion chamber and a compensation chamber, the annular piston slidably carried in the accumulator and about the piston rod, wherein the accumulator includes a wall that is matingly received within the mount and a bushing positioned about the piston rod wherein the annular piston extends between and sealingly bears against the bushing and the wall.

5. A damper assembly comprising:

a tube defining at least one chamber;

a piston assembly slidably positioned within the tube;

a piston rod connected to the piston assembly, exiting the tube, and having a terminal end;

a mount secured to the terminal end of the piston rod;

an accumulator carried about the piston rod including an annular piston separating the accumulator into an expansion chamber and a compensation chamber, the annular piston slidably carried in the accumulator and about the piston rod, wherein the mount includes an inner cup and an outer cup resiliently bonded to the inner cup by an elastic element and wherein the accumulator includes a wall that is matingly received within the inner cup.

* * * * *